(12) United States Patent
Friedman

(10) Patent No.: US 12,161,111 B2
(45) Date of Patent: Dec. 10, 2024

(54) COMPOSITIONS AND METHODS FOR TREATING CITRUS PLANTS INFECTED WITH BACTERIA AND FOR PROMOTING GENERAL AGRICULTURAL HEALTH

(71) Applicant: Peter Friedman, Bartow, FL (US)

(72) Inventor: Peter Friedman, Bartow, FL (US)

(73) Assignee: Peter Friedman, Bartow, FL (US)

( * ) Notice: Subject to any disclaimer, the term of this patent is extended or adjusted under 35 U.S.C. 154(b) by 360 days.

(21) Appl. No.: 15/715,088

(22) Filed: Sep. 25, 2017

(65) Prior Publication Data

US 2018/0242590 A1 Aug. 30, 2018

Related U.S. Application Data

(60) Provisional application No. 62/398,837, filed on Sep. 23, 2016.

(51) Int. Cl.
| | | |
|---|---|---|
| *A01N 25/00* | (2006.01) | |
| *A01N 25/08* | (2006.01) | |
| *A01N 63/10* | (2020.01) | |
| *A01N 63/50* | (2020.01) | |

(52) U.S. Cl.
CPC ............. *A01N 25/00* (2013.01); *A01N 25/08* (2013.01); *A01N 63/10* (2020.01); *A01N 63/50* (2020.01)

(58) Field of Classification Search
None
See application file for complete search history.

(56) References Cited

U.S. PATENT DOCUMENTS

| | | | | |
|---|---|---|---|---|
| 5,780,023 | A | 7/1998 | McLaughlin | |
| 8,546,360 | B2 * | 10/2013 | Musson, IV | A01N 59/06 |
| | | | | 514/141 |
| 8,592,208 | B2 * | 11/2013 | Shroff | C12N 5/0606 |
| | | | | 435/366 |
| 8,945,631 | B2 * | 2/2015 | Masaoka | A01N 37/44 |
| | | | | 424/648 |
| 9,375,014 | B2 * | 6/2016 | Musson, IV | A01N 59/06 |
| 9,446,075 | B2 | 9/2016 | Maguire | |
| 2014/0205563 | A1 | 7/2014 | Maguire et al. | |
| 2015/0071877 | A1 | 3/2015 | Maguire et al. | |
| 2016/0081347 | A1 * | 3/2016 | Niedermeyer | A01N 25/04 |
| | | | | 424/405 |

OTHER PUBLICATIONS

Freshney, Culture of Animal cells: a manual of basic techniques (1987).
Flax, et al., Engraftable Human neural stem cells respond to development cues replace neurons and express foreign genes, "Nature Biotechnol.", vol. 16, pp. 1033-1039 (1998).
Frisen, et al., Central nervous system stem cells in the embryo and adult, "Cell Mol. Life Sci.", vol. 54, pp. 935-945 (1998).
Krasnodembskaya, et al., Antibacterial effect of human mesenchymal stem cells is mediated in part from secretion of the antimicrobial peptide LL-37, "Stem Cells Journal", vol. 28, Issue 12, pp. 2229-2238 (2010).
Krasnodembskaya, et al., Human mesenchymal stem cells reduce mortality and bacteremia in gram-negative sepsis in mice in part by enhancing the phagocytic activity of blood monocytes, "Am. Physiol. Society", vol. 302, Issue 10, pp. L1003-L1013 (2012).

* cited by examiner

*Primary Examiner* — Blaine Lankford
(74) *Attorney, Agent, or Firm* — Timothy H. Van Dyke; Wolter, Van Dyke, Davis, PLLC

(57) ABSTRACT

A method for preparing a stem cell-based, human derived composition containing conditioned cell culture medium is disclosed. The method comprises culturing cells of two or more eukaryotic cell lines to form conditioned culture media, separating the cultured cells from the conditioned culture media, and combining conditioned culture media to form a bioactive composition. This composition is used to treat citrus plants that have been infected by one or more insect-vectored bacterial and/or pathogenic infections such as Citrus Greening. This method consists of applying the conditioned media one or more times to the plant. Use of this treatment may have application to a variety of other agricultural conditions.

14 Claims, No Drawings

COMPOSITIONS AND METHODS FOR TREATING CITRUS PLANTS INFECTED WITH BACTERIA AND FOR PROMOTING GENERAL AGRICULTURAL HEALTH

FIELD

The present disclosure relates to the fields of agriculture, infectious disease, cell biology, molecular biology, and genetics. Furthermore, this disclosure relates to methods of making a composition comprising culture media that have been conditioned by cells of two or more animal cell lines such as, for example, stem cell lines. More specifically, this disclosure relates to methods of improving citrus plant growth by reducing the incidence of insect-vectored bacterial infections and improving the general health of the plant.

BACKGROUND

Unless otherwise indicated herein, the materials described in this section are not prior art to the claims in this application and are not admitted to be prior art by inclusion in this section.

Huanglongbing (HLB) or Citrus Greening is an invasive, bacterial disease of citrus that is devastating the largest citrus industry in the US and is threatening other major citrus producing regions throughout the world. Since its first appearance in Florida eight years ago, the bacterium that causes the disease has decimated Florida's $9 Billion citrus industry, costing the industry as many as 8,000 jobs and $4.5 Billion in crop damage. Thought to have originated in China in the early 1900's, this bacterial disease is spread by two species of psyllid insects, but only one, *Candidatus Liberibacter asiaticus,* the Asian strain, is the cause of Citrus Greening. This bacteria is a fastidious phloem-limited species that has not yet been cultured. Control of bacterial plant pathogens, such as HLB, is difficult because of the limited bactericides available and because they only act as a protective film on the outside of the plant. Insect transmission, as in the case of HLB, bypasses this protective barrier and insect control alone cannot prevent disease spread.

Other than tree removal, there has been no known effective control once a tree has become infected and there is no known cure for the disease. Infected trees may produce misshapen, unmarketable, bitter fruit. Citrus Greening reduces the quality and quantity of citrus fruits, eventually rendering infected trees useless. Average productive lifespan of citrus trees infected by the bacteria has dropped from 50 years to 15 or less. An infected tree produces fruit that is not usable for consumption or the manufacture of juice. Furthermore, trees infected with the disease often die within 3-5 years.

Citrus trees infected by HLB may not show symptoms of the disease for years after infection. Initial symptoms include a blotchy leaf mottling and yellowing of the leaf veins. As the bacterial infection spreads throughout the entire tree, the entire leaf canopy progressively becomes yellow.

SUMMARY

Described herein is a novel and unique strategy for combating HLB that employs a human derived, antimicrobial systems therapeutic approach containing antimicrobial, topical agents capable of penetrating leaf, bark and root to attack the bacteria in the vascular tissue (phloem) of the plant where it lives. This treatment will improve overall health of fruit production and quality of the citrus. This treatment may be useful against other bacterial pathogens such as Canker, which significantly limit food production and threaten farmers livelihoods.

According to one embodiment, disclosed is a method and composition has been developed for treating citrus plants specifically and other plants generally to reduce or eliminate one or more insect-vectored bacterial infections as does occur with Citrus Greening. This method requires the application one or more times of a specific formulation of Stem Cell Released Molecules (SRM) contained in the conditioned media from one or more human stem cell or progenitor cell types. The SRM are known to contain powerful antimicrobial factors in addition to other molecules that promote the overall health of mammalian cells and tissue. Early experimental pilot data suggests that this human derived, SRM-based antimicrobial system is applicable to the treatment of bacterial infections in plants.

While the application of genetically modified plants and organisms to the field of agriculture has been extensively used to create plant resistances to herbicides, drought, salt, and diseases, the application of regenerative medicine approaches utilizing conditioned media have not been introduced into agriculture as a means to combat specific infections or to increase the general health of plants.

Regenerative medicine utilizing conditioned media derived from cell cultures, such as stem cell cultures, increasingly attracts attention as a versatile alternative technique for treating human diseases that are difficult to treat by conventional medicine. For example, one of the major unmet needs in medicine today is a treatment for diseases and conditions that involve complex, multi-molecular processes that cannot simply be treated by administration of a single chemical entity or growth factor. The need for systems based approach to treating disease conditions in which multiple molecules are used to treat multiple disease pathways is being used more frequently by modern medicine.

Experimental data of the use of conditioned culture media in the treatment of various diseases and health conditions in both human and non-human animals have been accumulating in recent years. Several studies reported beneficial effects of stem cell therapy in degenerative diseases such as myocardial infarction and revealed that stem cells cause tissue repair due to their ability to secrete trophic factors that exert beneficial impact on the damaged tissue, rather than their capacity to differentiate into the needed cells. Various studies on stem cell-derived secreted factors (SRM) have showed that the secreted factors alone without the stem cell itself may cause tissue repair in various conditions that involved tissue/organ damage. Further, it has been reported that stem cells provide the extracellular microenvironment with a wide range of growth factors, cytokines and chemokines, which are often broadly defined as the stem cells secretome and can include micro-vesicles or exosomes. In in vitro condition, these molecules can be traced from the conditioned medium or spent media harvested from cultured cells, and thus the medium comprising these secreted cellular factors is called conditioned culture medium. Conditioned medium now serves as a new treatment modality in regenerative medicine and has shown a successful outcome in some diseases.

Since conditioned culture media containing the SRM are devoid of cells, there is no need to match the donor and the recipient to avoid rejection problems. Therefore, While the application of Plant Stem Cells have found their usefulness in the treatment of human skin care, the reverse, where human stem cells have been applied to mediate, treat or cure agricultural infections (such as Citrus Greening) has not been applied. Herein is the first application of human stem cell cultured media used for the treatment and cure of an agricultural bacterial infection.

Recent research (Krasnodembskaya, et al., 2010) has identified specific antibacterial effects of human mesenchymal stem cells (MSCs) that are mediated, in part by the secretion of the antimicrobial peptide LL-37. Additionally, in-Vivo studies have shown that MSCs have beneficial effects in the treatment of sepsis induced by bacterial infection. Administration of MSCs in these studies improved survival and enhanced bacterial clearance. Krasnodembskaya and associates also studied the effects of MSCs and the conditioned media from MSCs on the bacterial growth of both Gram-positive (*Staphylococcus aureus*) and Gram-negative (*Escherichia coli* and *Pseudomonas*) bacteria. In both uses of MSCs, bacterial growth was markedly inhibited; these effects believed to be caused by the MSC s upregulation of the antibacterial protein lipocalin 2.

In a study of bacterial induced pneumonia, the most common infectious cause of death worldwide and one that is increasingly hampered by antibiotic resistance, Gupta, et al., 2012 similarly found that the addition of MSCs will enhance the survival of subjects and bacterial clearance in murine *Escherichia coli* pneumonia. Similar therapeutic effects of MSCs to restore lung function in humans suffering from bacterial infections have been found by Lee, et al., 2013. They noted fluid clearance, reduced inflammation and exerted antimicrobial activity, in part through keratinocyte growth factor secretion by the MSCs. Still other studies examining the ability of MSCs to reduce mortality and combat polymicrobial peritoneal sepsis in the mouse model have found great success (Krasnodembskaya, et al., 2012).

These studies emphasize the fact that MSCs release a variety of antimicrobial factors (Peptide LL-37, Lipocalin2, and keratinocyte growth factor, in addition to another class of stem cell-based, human derived antimicrobials known as Defensins) which all play a role in mitigating bacterial infections. Other antimicrobial agents may also be released by the MSCs that as of yet have not been identified. It is likely, however, that multiple antimicrobial molecules are acting together in a synergistic fashion to mitigate infection. In this manner, the SRM from MSCs are acting as a systems therapeutic, perhaps addressing multiple pathways in the bacterial infection.

A small pilot study has been performed using the Compositions and Methods described below to create the SRMs used to treat Citrus Trees infected with HLB. Utilizing field grown trees approximately 5 years old, leaf samples were obtained and tested for HLB by USSC/Southern Gardens Diagnostic Lab, Polk County Fla. All leaf samples came back as "HLB Positive" indicating the presence of the bacteria. Two experimental conditions were evaluated. One consisted of applying a topical spray of the SRM directly to the leaves. The second treatment condition was a topical spray of the SRM which included the "penetrant" LI 700 from Loveland Products, in addition to applying the SRM (without penetrant) directly to the roots of the tree. Leaf samples were obtained after 60 days and retested by Southern Gardens Diagnostic Lab. The results of this pilot experiment indicated that the experimental condition receiving the root soak became HLB Negative, providing evidence that the SRM treatment appeared to kill the bacteria.

The present disclosure relates to a method for treating agricultural infections in citrus trees in need thereof. Further aspects and alternatives disclosed herein relate to a method for increasing the nutraceutical value of citrus fruit. Additional aspects and alternatives disclosed herein relate to a method for treating citrus canker and other agricultural conditions.

In one aspect, some alternatives disclosed herein relate to a method for making a composition. The method includes culturing cells of a first cell line and a second cell line in a first and a second culture medium, wherein the cells secrete extracellular products into the respective culture medium so that a first conditioned culture medium and a second conditioned culture medium are respectively formed; optionally culturing cells of a third cell line in a third culture medium wherein the cells secrete extracellular products into the culture medium so that a third conditioned culture medium is formed; separating the first, second, and optionally third conditioned culture media from the respective cultured cells; and combining the first and the second conditioned culture media, and optionally the third conditioned culture medium, to form a composition. In the method, the first, second, and optionally third cell lines are different from one another and are each selected from the group consisting of an adipose-derived stem cell (ADSC) line, a non-adipose mesenchymal stem cell line, a fibroblast cell line, and an intestinal cell line.

Implementations of the method according to this aspect of the disclosure can include one or more of the following features. The first cell line, in some particular alternatives, is an ADSC line. In some alternatives, the second cell line is a fibroblast cell line. In some alternatives, the bioactive composition includes culture medium conditioned by cells of a third cell line. In some particular alternatives, the third cell line is an intestinal cell line.

In some particular alternatives of this aspect and other aspects of the disclosure, each of the culturing steps is performed for at least 2 days, at least 5 days, at least 7 days, at least 8 days, or at least I 0 days. In some alternatives, each of the culturing steps is carried out until said culture reaches at least 85%, at least 90%, at least 95%, or at least 98% cell confluence. In some particular alternatives, the cells of at least one of the cell lines have been passaged multiple times to produce the conditioned culture media. In some particular alternatives, the cells of at least one of the cell lines have been passaged at least 2, 3, 4, 5, 6, 7, 8, 9, or 10 times to produce said conditioned culture media. In certain alternatives, the cells of at least one of the cell lines are passaged after reaching at least 85%, at least 90%, at least 95%, or at least 98% cell confluence. In some other alternatives, the bioactive composition includes a ratio of the first conditioned culture medium to the second conditioned culture medium of between about I:I 0 to about I 0:1. In some particular alternatives, the ratio of the first conditioned culture medium to the second conditioned culture medium is about 1:1.

In some alternatives, the method for making a bioactive composition disclosed herein further includes formulating the composition to form an aerosol, a cream, a dispersion, an emulsion, a film, a foam, a gel, a liquid, a lotion, a lyophilisate, a mousse, an ointment, a powder, a solid, a spray, or a suspension. In some alternatives, the bioactive composition is suitable for application to leaves, bark, fruit, roots of plants applied as an insecticide, a fungicide, a nutraceutical application, or a pharmaceutical application.

In one aspect, the present disclosure further relates to a formulation that includes a composition prepared by culturing cells of a first cell line and a second cell line in a first and a second culture medium, wherein the cells secrete extracellular products into the respective culture medium so that a first conditioned culture medium and a second conditioned culture medium are respectively formed; optionally culturing cells of a third cell line in a third culture medium wherein the cells secrete extracellular products into the culture medium so that a third conditioned culture medium is formed; separating the first, second, and optionally third conditioned culture media from the respective cultured cells; and combining the first and the second conditioned culture media, and optionally the third conditioned culture medium, to form the composition. In the formulation according to this aspect, the first, second, and optionally third cell lines can be different from one another and are each selected from the group consisting of an adipose-derived stem cell (ADSC) line, a non-adipose mesenchymal stem cell line, a fibroblast cell line, and an intestinal cell line. In some particular alternatives of this aspect, implementations of the method provided herein can include one or more of the following features. The first cell line, in some particular alternatives, is an ADSC line. In some particular alternatives, the first cell line is an epithelial stem cell line. In some alternatives, the second cell line is a fibroblast cell line. In some alternatives, the bioactive composition includes conditioned culture medium from a third cell line. In some particular alternatives, the third cell line is an intestinal cell line.

In a further aspect, the present disclosure provides a method for treating the condition of Citrus Greening in a subject in need thereof comprising administering to agricultural entities a therapeutically effective amount of a formulation disclosed herein. The administering of the method, in some particular alternatives, includes topical administration of the bioactive formulation to the trees via a carrier vehicle, such as a carrier vehicle selected from the group consisting of an aerosol, a liquid drop, a liquid wash, an ointment, a cream, a gel, a powder, a salve, a lotion, a foam, a spray, and a liposome. In some alternatives, the bioactive is administered topically to the citrus trees. In some alternatives, the administering of the method disclosed herein includes infusion of the bioactive formulation to the trees via a device, such as a device selected from the group consisting of a pump-catheter system, a continuous or selective release device. Additional considerations include the use of surfactants to facilitate the effectiveness of the SRM application. Surfactants can increase the effectiveness by breaking down the waxy cuticle on the leaf surface and improving adhesion between the SRM and the plant surface.

In a further aspect, the present disclosure provides a method of providing a BioStimulant condition that has the potential of mitigating Citrus Greening.

DETAILED DESCRIPTION

The present disclosure generally describes bioactive compositions and formulation as well as methods for making and using same, and particularly to bioactive compositions including culture media that have been conditioned by culturing two or more eukaryotic cell types, and each contains bioactive substances that can be defined or undefined. The cells are preferably mammalian cells, most preferably human. In some alternatives, culture media that are conditioned by cells and tissue cultures as disclosed herein contain a variety of naturally secreted proteins, such as biologically active growth factors. In some alternatives, the present disclosure also relates to novel compositions comprising products derived from the conditioned cell media and uses for these compositions. The disclosure further relates to methods for treating various agriculture disease and health conditions, such as Citrus Greening, Canker and Post Blossom Fruit Drop among other conditions.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art.

Definitions

The singular form "a", "an", and "the" include plural references unless the context clearly dictates otherwise. For example, the term "a cell" includes one or more cells, including mixtures thereof. "A and/or B" is used herein to include all of the following alternatives: "A", "B", "A or B", and "A and B".

"About" means either within plus or minus I 0% of the provided value, or rounded to the nearest significant figure, in all cases inclusive of the provided value. Where ranges are provided, they are inclusive of the boundary values.

The terms "administration" and "administering" as used herein refer to the delivery of a bioactive composition or formulation by an administration route including, but not limited to, surface spray, injection or direct soaking or some combination thereof.

The terms "bioactive composition" and "bioactive formulation", as used herein, are intended to mean a composition, formulation, product, or ingredient that is bioactive and is prepared from the conditioned culture media disclosed herein. For example, a bioactive composition can be an insecticide, fungicide, algaecide, or as an additive for increasing nutraceutical value to the plant or fruit or as a mechanism to improve the general health of the plant. It should also be understood that in some alternatives the bioactive composition will be an ingredient for incorporation into other compositions.

The term "cell line" as used herein refers to one or more generations of cells which are derived from a clonal cell. The term "clone," or "clonal cell," refers to a single cell which is expanded to produce an isolated population of phenotypically similar cells (i.e. a "clonal cell population").

The terms "conditioned culture medium" and "conditioned cell medium" are used interchangeably and refer to a culture medium in which a specific cell or population of cells have been cultured in, and then optionally removed. While the cells were cultured in the medium, they secrete cellular factors that include, but are not limited to anti-microbials, hormones, cytokines, extracellular matrix (ECM), metabolites, proteins, vesicles, exosomes, microRNAs, antibodies, and granules. The medium comprising the cellular factors is the conditioned medium.

The term "confluence," as used herein refers to a state of growth of mammalian cells at which cells have proliferated to an extent that cells are observed to touch (thereby "becoming confluent"). Confluence is thus a relative assessment of cell density, e.g., on the surface of a plate. Less-relative measures of cell density can also be used to assess confluence, including, e.g., cell counting (e.g., in certain alternatives, cells are grown to confluence such that approximately 106 cells are present per mL in culture, e.g., involving growth of cells in a 10 cm plate in 10 mL culture medium).

As used herein, the term "epithelium" is herein defined as membranous tissue composed of one or more layers of cells separated by very little intercellular substance and forming the covering of most internal and external surfaces of the body and its organs comprising one or more epithelial cell types. The term "epithelial stem cell" is herein defined as a stem cell being capable of differentiation into a variety of epithelial cell types.

The term "fibroblast" as used herein refers to a type of cell encountered in many tissues of the body including connective tissue and that can be derived using standard cell culture methods. For example, fibroblasts can be generated from adult and fetal tissues including blood, bone marrow, cord blood and placenta. In one alternative, the fibroblast is a dermal fibroblast. The term "dermal fibroblast" as used herein refers to fibroblasts isolated from skin of any animal, such as a human. In one alternative, the animal is an adult. In another alternative, the fibroblast has been cryopreserved.

As used herein, the term "mesenchymal stem cell" refers to mesodermal germ lineage cells which may or may not be differentiated. The mesenchymal cells that are suitable for the compositions and methods disclosed herein include cells at all stages of differentiation beginning with multipotent mesenchymal stem cells, down to fully differentiated terminal cells.

As used herein, a "therapeutically effective amount," "therapeutically effective concentration" or "therapeutically effective dose" is an amount which, as compared to a corresponding Plant/subject/who has not received such amount, results in improved treatment, healing, prevention, or amelioration of a disease, disorder, or side effect, or a decrease in the rate of advancement of a disease or disorder. This amount will vary depending upon a variety of factors, including but not limited to the characteristics of the bioactive compositions and formulations disclosed herein (including activity, pharmacokinetics, pharmacodynamics, and bioavailability thereof), the physiological condition of the Plant treated (including age, disease type and stage, general physical condition, responsiveness to a given dosage,). A typical dosage may range from about 0.1 mg/kg to about 100 mg/kg or more, depending on the factors mentioned above. In other alternatives, the dosage may range from about 0.1 mg/kg to about 100 mg/kg; or about 1 mg/kg to about 100 mg/kg; or about 5 mg/kg up to about 100 mg/kg. For topical applications suitable dosage may range from about 1 mg/kg to about 10 g/kg; or about 10 mg/kg to about 1 g/kg; or about 50 mg/kg up to about 10 g/kg.

A "stem cell" as used herein refers to an undifferentiated cell which is capable of remaining in an undifferentiated state (e.g., pluripotent or multipotent stem cell) for extended periods of time in culture until induced to differentiate into other cell types having a particular, specialized function (e.g., fully differentiated cells). Stem cells have varying degrees of potency.

The term "stem cell released molecules" or SRM's is a generic term for a group of anti-microbial chemicals, proteins, microRNAs, and other molecules secreted by cultured stem cells and the other cell types disclosed herein, and can be found in the medium wherein the cells are cultured and thus such a medium is called conditioned culture medium. Thus, SRM can comprise mucins, cytokines, and growth factors. The term "mucin" as used herein, is intended to refer to any of a group of protein-containing glycoconjugates with high sialic acid or sulfated polysaccharide content that compose the chief constituent of mucus. The term "interleukin" is herein used as a generic term for a group of multifunctional cytokines that are produced by a variety of lymphoid and nonlymphoid cells and whose effects occur at least partly within the lymphopoietic system. The term "cytokine", as used herein, is defined as a generic term for non-antibody proteins released by one cell population on contact with specific antigen, which act as intercellular mediators, as in the generation of an immune response. In some alternatives, the compositions disclosed herein may include SRMs or conditioned media containing SRMs secreted by at least two cell lines.

The term "subject" as used herein refers to agricultural entities, plants and trees who are treated with the bioactive compositions and formulations and/or in accordance with the methods described herein.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

In some alternatives disclosed herein, a therapeutic composition generally comprises an amount of stem cells and stem cell released molecules (SRM's) being derived from a first cell line by in vitro culture. The stem cells and SRM's are generally cultured in a nutrient medium by way of Petri dishes, flasks, bioreactors, and the like. In some alternatives, cell cultures can be made using two-dimensional or three-dimensional culture technologies. Once sufficient SRM's are produced, the cells and SRM's are suspended in an aqueous solution.

In certain alternatives, the bioactive composition disclosed herein can further include an amount of stem cells and SRM's derived from a second cell line, wherein the second cell line is distinct from the first cell line. In this regard, a plurality of stem cells and SRM's can be administered to effectuate a synergistic and emergent healing response in vivo.

In some alternatives, three or more cell lines are provided and cultured to yield respective SRM's, wherein each of the cell lines is distinct from each other.

Many cell lines are commercially available in the art.

Cytokines include immune-modulating agents, such as interleukins and interferons. These agents are capable of soliciting and inducing an immune response in vivo.

Growth factors are naturally occurring substance capable of stimulating cellular growth, proliferation and cellular differentiation. Growth factors generally include proteins and steroid hormones, and are important for regulating a variety of cellular processes.

Examples of growth factors include: LIF, VEGF, HGF, SDF, SCF, M-CSF, bFGF, IGFBP, Oncostatin M, MIP 1-13, TIMP-2, TGF-131, TGF-132, PDGF, EGF, KGF, GM-CSF, HGF, MCP-1, TNFa, FGF-2, Flt-3, PDGF-AA, and TGF-133.

Keratinocyte growth factor (KGF) and hepatocyte growth factor (HGF), among others, have been obtained by in vitro culture of stem cells and incorporated into therapeutic compositions according to various alternative alternatives.

In various alternatives, stem cells are generally stimulated to induce secretion of targeted SRM's in culture. This is generally accomplished by introducing the cultured cells to certain antigens, cytokines, and other molecules during in vitro processing to simulate a bio-condition. In this regard, certain antigens or other stimulants may stimulate the cultured cells into producing the targeted SRM's. Furthermore, the cells can further differentiate into specific cell types, or matured in vitro by introducing certain antigens, proteins, and other bio-molecules. Throughout the culturing process, the stem cells can be transformed into differentiated or matured cells, and SRM's can be synthesized through one or more simulated bio-conditions in vitro. Thus, the harvested cells can be transformed and new molecules produced through in vitro culturing.

In certain alternatives, cells are manipulated in culture by any of: depleting a culture medium of certain nutrients to replicate a bio-condition; accumulating dead or ablated cells in the nutrient medium; and cell to cell contact to stimulate differentiation and maturation of cells, or other technique known to those having skill in the art.

Cell Lines

According to some alternatives, the conditioned culture media described herein can be conditioned by specific cell lines. Preferably, each of the cell lines is substantially free of other cell types and extracellular matrix material, more preferably, the cell line if completely free of such other cell types and matrix materials. The cell line is derived from any animals, preferably from a primate, and more preferably from a higher primate (such as a baboon or ape), and most preferably from human. In some alternatives, the cell line will be derived from a human tissue, which can be an adipose or non-adipose tissue.

Suitable cell lines for the methods and compositions disclosed herein include stromal cells, parenchymal cells, mesenchymal stem cells, liver reserve cells, neural stem cells, pancreatic stem cells, adipose-derived stem cells (ADSC), non-adipose mesenchymal stem cells, fibroblast cells, hair dermal papilla (HDP) cells, limbal stem cells, and/or embryonic stem cells. Further, mesenchymal stem cells (lineage committed or uncommitted progenitor cells) are advantageous "stromal" cells for use in some particular alternatives of the compositions and methods disclosed herein. The cells may differentiate into osteocytes, fibroblasts of the tendons and ligaments, marrow stromal cells, adipocytes and other cells of connective tissue, chondrocytes, depending of course, on endogens or supplemented growth and regulatory factors and other factors including prostaglandin, interleukins and naturally-occurring chalones which reversibly inhibit and/or regulate cell proliferation and/or differentiation. In some alternatives, suitable for the compositions and methods disclosed herein are stromal cells, parenchymal cells, mesenchymal stem cells (lineage committed or uncommitted progenitor cells), liver reserve cells, neural stem cells, pancreatic stem cells, and/or embryonic stem cells. In some alternatives, suitable cells may include, but are not limited to, bone marrow, skin, liver, pancreas, kidney, neurological tissue, adrenal gland, mucosal epithelium, and smooth muscle. Fibroblasts and fibroblast-like cells and other cells and/or elements that comprise the stroma may be fetal or adult in origin, and may be derived from convenient sources such as skin, liver, pancreas, mucosa, arteries, veins, umbilical cord, and placental tissues, etc. Such tissues and/or organs can be obtained by appropriate biopsy or upon autopsy. Additionally, cadaver organs may be used to provide a generous supply of stromal cells and elements.

The isolation and culture of mesenchymal stem cells are also known in the art. See William et al., Am Surg. 65:22-26 (1999), and Mackay et al., Tissue Eng. 4:415-428 (1988). Additionally, neural stem cells may be isolated in the manner described in Flax et al., Nature Biotechnol., 16:1033-1039 (1998); and Frisen et al., Cell. Mol. Life Sci., 54:935-945 (1998).

In some particular alternatives, the cells may be cultured in any manner known in the art including in monolayer, cell suspension, beads or in three-dimensions and by any means (i.e., culture dish, roller bottle, a continuous flow system, etc.). Methods of cell and tissue culturing are well known in the art, and are described, for example, in Cell & Tissue Culture: Laboratory Procedures, John Wiley & Sons Ltd., 1996; and Culture of Animal Cells: A Manual of Basic Techniques, Freshney 1987.

Preferably, the cell lines utilized in the bioactive compositions and methods disclosed herein are carefully screened for human and animal pathogens. Depending upon the application, such screening may be of critical importance where only pathogen free cells are acceptable (e.g., for wound healing, food additives, etc.) Methods of screening for pathogens are well known in the art.

In some alternatives of the compositions and methods disclosed herein, the cells can be genetically engineered to express a target gene product which is biologically active which provides a chosen biological function, or acts as a reporter of a chosen physiological condition, or augments deficient or defective expression of a gene product, or provides an anti-viral, anti-bacterial, anti-microbial, or anti-cancer activity. In accordance with some alternatives, the target gene product may be a peptide or protein, such as an enzyme, hormone, cytokine, antigen, or antibody, a regulatory protein, such as a transcription factor or DNA binding protein, a structural protein, such as a cell surface protein, or the target gene product may be a nucleic acid such as a ribosome or antisense molecule. The target gene products include, but are not limited to, gene products which enhance cell growth. For example, the genetic modification may upregulate an endogenous protein, introduce a new protein or regulate ion concentration by expressing a heterologous ion channel or altering endogenous ion channel function. Other examples include, but are not limited to engineered tissues that express gene products which are delivered systemically (e.g., secreted gene products such as proteins including Factor VIII, Factor IX, growth factors, hormones, enkaphalins, and neurotransmitters). Methods that are useful to genetically engineer the cells that can be used to condition the culture media included in the bioactive compositions and formulation disclosed herein are well-known in the art.

Cell Culture Media and Supplements

Culture medium in in vitro culture represents microenvironment in in vivo conditions and may determine cell fate and thus cell secretion. Therefore, the same type of cells may secrete different level of growth factors when are cultured in different media. A number of basal cell culture media formulations are known in the literature and many are commercially available. Pre-conditioned cell culture medium can be any cell culture medium which adequately addresses the nutritional needs of the cells being cultured. Examples of basal cell media include, but are not limited to Complete MesenPRO RS™ Medium, Dulbecco's Modified Eagle's Medium (DMEM), Mesenchymal Stem Cell Medium (MSMC), Ham's F12, RPMI 1640, Iscove's, McCoy's, aMEM, DMEM/F12, MI 99, EBM2, EGM-2, In Vivo 15, or chemically defined media, and other media formulations readily apparent to those skilled in the art, including those found in Methods For Preparation of Media, Supplements and Substrate For Serum-Free Animal Cell Culture, Alan R. Liss, New York (1984) and Cell & Tissue Culture: Laboratory Procedures, John Wiley & Sons Ltd., 1996.

In some alternatives, the same type of cell can be cultured in different kinds of basal medium. Additionally, the appropriate concentrations of the ingredients in a given basal growth medium are well known to one of ordinary skill in the art. See, for example, Methods For Preparation Of Media, Supplements and Substrate for Serum-free Animal Cell Cultures, supra. The ingredients include amino-acids (both D and/or L-amino acids) such as glutamine, alanine, arginine, asparagine, cystine, glutamic acid, glycine, histidine, isoleucine, leucine, lysine, methionine, phenylalanine, praline, serine, threonine, tryptophan, tyrosine, and valine and their derivatives; acid soluble subgroups such as thiamine, ascorbic acid, ferric compounds, ferrous compounds, purines, glutathione and monobasic sodium phosphates.

Additional ingredients such as vitamins, growth and attachment factors, proteins and the like, can be selected by those of skill in the art in accordance with any particular need. Particularly suitable ingredients, in some alternatives, include sugars, deoxyribose, ribose, nucleosides, water soluble vitamins, riboflavin, salts, trace metals, lipids, acetate salts, phosphate salts, HEPES, phenol red, pyruvate salts and buffers.

Other ingredients often used in media formulations include fat soluble vitamins (including A, D, E and K) steroids and their derivatives, cholesterol, fatty acids and lipids Tween 80, 2-mercaptoethanol pyramidines as well as a variety of supplements including serum (calf, fetal, horse, etc.), proteins (insulin, growth factors, hormones, transferrin, etc.), antibiotics (amphotericin B, gentamicin, penicillin, streptomycin, etc.), whole egg ultra-filtrate, and attachment factors (fibronectins, collagens, laminins, tenascins, vitronectins, etc.).

In some particular alternatives of the method of making a bioactive composition disclosed herein, each of the cell lines can be cultured for at least 2 days, at least 5 days, at least 7 days, at least 8 days, or at least 10 days to form the respective conditioned culture medium. In some alternatives, each of the culturing steps is carried out until said culture reaches at least 85%, at least 90%, at least 95%, or at least 98% cell confluence. In some alternatives, the cells of at least one of the cell lines have been passaged multiple times to produce the conditioned culture media. In some particular alternatives, the cells of at least one of the cell lines can be passaged at least 2, 3, 4, 5, 6, 7, 8, 9, or 10 times to form the conditioned culture media.

Recovery of the Conditioned Culture Media

According to some aspects and alternatives of the present disclosure, the cells can be cultured by generally any means, methods and systems known in the art. Preferably, the cells are cultured in an environment which enables aseptic processing and handling. In some alternatives, the culture media be conditioned in a manner allowing for large scale growth (and yielding large scale conditioned media) using, for example, an apparatus for aseptic large scale culturing.

In some alternatives, cultured cells can be separated from the culture media in which they have been grown or maintained by one or more methods known in the art, for example using cell settling and decant, batch, continuous centrifugation, and/or microfiltration. The cell-free conditioned culture media obtained may be further processed to concentrate or reduce one or more factors or components, for example using filtration, diafiltration or chromatographic purification.

In some alternatives, following removal of the cultured cells from the conditioned medium, it may be necessary to further process the resulting supernatant. Such processing can include, but are not limited to, concentration by a water flux filtration device or by diafiltration, or by using any of the methods described in Cell & Tissue Culture: Laboratory Procedures, supra. Additionally, the conditioned medium can be further processed for product isolation and purification to remove unwanted substances and compounds, such as proteases. The methods used for product isolation and purification so that optimal biological activity is maintained will be readily apparent to one of ordinary skill in the art. For example, it may be desirous to purify a secreted cellular growth factor, regulatory factor, peptide hormone, antibody, etc. Such methods include, but are not limited to, gel chromatography (using matrices such as Sephadex™) ion exchange, metal chelate affinity chromatography with an insoluble matrix such as cross-linked agarose, HPLC purification, and hydrophobic interaction chromatography of the conditioned media. Such techniques are known, many of which are described in greater detail in, e.g., Cell & Tissue Culture; Laboratory Procedures, supra. Further, depending upon the desired application of the conditioned medium, and/or products derived thereof, appropriate measures can be taken to maintain sterility. Alternatively or in addition, sterilization may be necessary and can be accomplished by methods known to one of ordinary skill in the art, such as, for example, heat and/or filter sterilization with care taken to preserve the desired biological activity.

Formulations

As described above, the compositions disclosed herein contain conditioned culture media that include a variety of useful anti-microbial agents and other factors and components such as growth factors, regulatory factors, peptide hormones, antibodies, and are therefore useful for a variety of applications, such as anti-microbial, bacteriostatic, anti-fungal and anti-viral applications in plants as well as providing nutraceutical applications.

In some particular alternatives, the conditioned culture media can be further processed to concentrate or reduce one or more factors or components contained within the media, for example, enrichment of a growth factor using immuno-affinity chromatography or, conversely, removal of a less desirable component, for any given application as described herein. In some alternatives, the bioactive formulations are made from media conditioned by two or more different cell lines. In some alternatives, bioactive formulations are made from media conditioned by three or more, four or more, five or more different cell lines. Typically, the cultured cells produce a multitude of growth factors and proteins that are subsequently secreted into the media at physiological ratios and concentrations. The conditioned culture media, therefore, provide a unique combination of factors and specified ratios that closely represent those found in vivo. In some alternatives, prior to combining the conditioned culture media to form a bioactive composition, it is preferable to remove cellular debris or other particular matter as well as proteases, lactic acid and other components potentially detrimental to cell growth. In other alternatives, the bioactive compositions can also include cells that have been cultured.

Surfactants which can be used to form pharmaceutical compositions and dosage forms can include, but are not limited to, hydrophilic surfactants, lipophilic surfactants, and mixtures thereof. In some alternatives, a mixture of hydrophilic surfactants may be employed. In some alternatives, a mixture of lipophilic surfactants may be employed. In some alternatives, a mixture of at least one hydrophilic surfactant and at least one lipophilic surfactant may be employed.

In some alternatives, one or more preservatives or other materials can be provided to the formulations for enhancing the therapeutic, nutraceutical, pharmaceutical, or other properties of the composition.

Methods of Treatment

The term "treating" and its grammatical equivalents as used herein include achieving a therapeutic benefit and/or a prophylactic benefit. By therapeutic benefit is meant amelioration or eradication of the underlying disorder being treated. Also, a therapeutic benefit is achieved with the amelioration or eradication of one or more of the disease condition (e.g., Citrus Greening). For prophylactic benefit, the compositions may be administered to a grove at risk of developing a particular disease, or to a subject reporting one or more of the symptoms of a disease, even though a diagnosis of this disease may not have been made. In some alternatives, the bioactive compositions can be administered to a subject to prevent progression of the symptoms or of the underlying disorder.

In some alternatives, the therapeutic agent is present m an amount sufficient to exert a therapeutic effect by an average of at least about 5, 10, 15, 20, 25, 30, 40, 50, 60, 70, 80, 90, more than 90%, or substantially eliminate the disease or at least one of its underlying symptoms.

The solubility of the components of the present compositions and formulations may be enhanced by a surfactant or other appropriate co-solvent in the composition. Such co-solvents can include polysorbate 20, polysorbate 60, polysorbate 80, Pluronic F68, Pluronic F-84, Pluronic P-103, cyclodextrin, or other agents known to those skilled in the art. In some alternatives, such co-solvents can be employed at a level of from about 0.01% to 2% by weight. In some alternatives, such co-solvents can be employed at a level of from about 0.5% to 1% by weight.

In some alternatives, the bioactive compositions disclosed herein can be formulated utilizing specific preservatives to maintain the integrity of the SRM. Suitable preservatives include: benzalkonium chloride, chlorobutanol, edetate disodium (EDTA), methyl paraben, Onamer M, propyl paraben, phenylethyl alcohol, sorbic acid, thimerosal, or other agents known to those skilled in the art. In some ophthalmic products according to come alternatives, such preservatives can be employed at a level of from 0.004% to 0.02%. In some alternatives, the preservative, preferably benzalkonium chloride, may be employed at a level of from 0.001% to less than 0.01%, e.g. from 0.001% to 0.008%, preferably about 0.005% by weight. In some alternatives, a concentration of benzalkonium chloride of 0.005% may be sufficient to preserve the compositions and formulations disclosed herein from microbial contamination.

The amount of administration and the number of administrations of the active ingredient used in the present compositions and methods may vary according to a variety of factors to be determined. Compositions disclosed herein may range in concentration from about 0.0001 to 10.0 W/V %, about 0.005 to 10.0 W/V %, about 0.01 to 10.0 W/V %, about 0.05 to 10.0 W/V %, about 0.1 to 10.0 W/V %, about 0.5 to 10.0 W/V %, about 1.0 to 10.0 W/V %, about 20 to 10.0 W/V %, about 3.0 to 10.0 W/V %, about 4.0 to 10.0 W/V %, or about 5.0 to 10.0 W/V %. One alternative has a formulation of about 1.0 to 10.0 W/V % of the active compositions disclosed herein. One alternative has a formulation of about 0.01 to 10.0 W/V % of the active composi-tions disclosed herein. One alternative has a formulation of about 5.0 to 10.0 W/V % of the active compositions disclosed herein.

The composition of the invention may also include one or more agriculturally acceptable carriers, diluents or adjuvants. The compositions may also comprise a broad range of additives such as surfactants, wetters, humectants, stickers, spreaders, stablisers and penetrants used to enhance the active ingredients and so called 'stressing' additives to improve spore vigor, germination and survivability such as potassium chloride, glycerol, sodium chloride and glucose. Additives may also include compositions which assist in maintaining microorganism viability in long term storage, for example unrefined corn oil and so called invert emulsions containing a mixture of oils and waxes on the outside and water, sodium alginate and conidia on the inside.

Examples of surfactants, spreaders and stickers include Fortune®, Pulse, C-Daxoil®, Codacide oil®, D-C. Tate®, Supamet Oil, Bond® Penetrant, Citowett® and Freeway.

Examples of suitable compositions including carriers, preservations, surfactants and wetting agents, spreaders, and nutrients are provided in U.S. Pat. No. 5,780,023 incorporated herein by reference.

Where selected for inclusion, common agricultural surfactants, such as TWEEN® (polysorbate surfactant (available from Rohm & Haas) are desirably included in the composition according to known protocols. It is important that any additives used are present in amounts that do not interfere with the effectiveness of the biological control agents.

Throughout this disclosure, various information sources are referred to and incorporated by reference. The information sources include, for example, scientific journal articles, patent documents, textbooks, and World Wide Web browser-inactive page addresses. The reference to such information sources is solely for the purpose of providing an indication of the general state of the art at the time of filing. While the contents and teachings of each and every one of the information sources can be relied on and used by one of skill in the art to make and use the alternatives disclosed herein, any discussion and comment in a specific information source should no way be considered as an admission that such comment was widely accepted as the general opinion in the field.

EXAMPLES

Example 1

Active Composition for Citrus Greening Treatment

In one example, a therapeutic composition for treatment of Citrus Greening disease included about 50% v/v conditioned medium derived from cell culture of a Human Adipose Derived Stem Cell (ADSC) line and about 50% v/v conditioned medium derived from cell culture of a Human Dermal Fibroblasts (HDF-f).

Cultivation of Human Adipose Derived Stem Cells (hADSC)

Preparation of MesenPro RS™ medium

Growth media used in this experiment is Complete MesenPRO RS™ Medium which is a reduced serum (2%) medium specifically formulated to support the growth of human mesenchymal stem cells (hMSCs) in culture. Typically, when growing in MesenPRO RS™ Medium, hMSCs can be expanded for multiple passages while maintaining their multipotential characteristics (i.e., differentiation into osteogenic, chondrogenic, and adipogenic lineages).

The Complete MesenPRO RS™ medium was prepared prior to use as follows. 10 mL of frozen MesenPRO RS™ GrowthSupplement (Catalog No. 12748) was slowly thawed at 37° C. and aseptically added to 500 mL of MesenPRO RS™ Basal Medium (Catalog No. 12747). The resultant solution was mixed thoroughly prior to the addition of 5 mL of a 100×L-glutamine stock solution (Glutamax, 200 mM L-glutamine; Catalog No. 35050). After preparation, the Complete MesenPRO RS™ medium was stored in the dark at 4° C. and used within 15 days.

Establishment of hADSC Cultures

Cells of STEMPRO® Human Adipose-Derived Stem Cells (hADSCs) (Life Technologies, Carlsbad) in a commercial frozen vial were thawed quickly by swirling the vial in a 37° C. water bath (1-2 minutes). Once thawed, hADSCs were immediately transferred into a 50-mL sterile conical tube containing 10-mL of pre-warmed Complete MesenPRO RS™ medium with gentle mixing at 37° C. Cell suspension was centrifuged for 150×g at room temperature. The supernatant was discarded and the conical tube was drained briefly over sterile gauze. Cell pellet was loosen by lightly tapping the tube on a hard surface, and gently resuspended in 10 mL of pre-warmed Complete MesenPRO RS™ medium (37° C.). 75 µL of the hADSC cell suspension was mixed with 75 µL of 0.4% Trypan Blue solution, and a cell count was determined by using a hemacytometer.

Seeding

The hADSC cell culture established as described above was aseptically seeded into a T75 flask (Sigma, Cat. No. Z707546) or a HYPERFlask® Cell Culture Vessel. For T75 flasks, 25-26 mL Complete MesenPRO RS™ media was pre-warmed to 37° C. prior to being seeded with approximately $5 \times 10^3$ cells per cm2, i.e. $3.75 \times 10^5$ cells per flask. T75 flasks were then gently rocked to disperse the seeded cells evenly over the growth surface.

For Corning HYPERFlask® vessels, Complete MesenPRO RS™ media was pre-warmed to 37° C. prior to being seeded with approximately $4 \times 10^6$ cells per flask. This seeding density typically supports the cell culture in the HYPERFlask™ vessel reaching a cell density of 90-95% within 7-8 days. For this purpose, an appropriate volume of cell suspension was added to 500 mL of pre-warmed Complete MesenPRO RS™ media (37° C.), followed by the addition an appropriate volume of the growth medium to bring the total volume to 550 mL. The seeded growth medium was gently mixed by swirling, and transferred into a HYPERFlask™ vessel. If occurred, excessive bubbles were removed and, if needed, additional growth medium was added to bring the fluid level in the flask equal to the second thread on the neck.

The following information of the cell culture was recorded: (1) live cell count; (2) viability; (3) total number of cells; (4) number of cells per flask; (5) volume of cell suspension added to each flask; and (6) the number and type of flasks seeded. After seeding, T75 flasks were placed on stainless steel tray in a humidified growth chamber, and incubated at 37° C. and in the presence of 5% CO2. HYPERFlask™ vessels are incubated directly on the incubator shelf Harvest Conditioned Culture Medium, Passage and Freeze Cells from HYPERFlask™ Vessels Harvest SRM-Containing Conditioned Media Upon reaching about 90-98% confluence, the cell cultured medium was aseptically transferred to a filter unit equipped with a 0.2 µM PES (polyethlysulfone) sterile filtration device. For this purpose, the HYPERFlask™ vessel was slowly tilted to pour the conditioned cell cultured medium, which was determined to contain SRMs, into the filter unit. While pouring, the flask was slowly rotated 180° until the cell cultured medium was flowing down the angle neck (air dam) of the flask. When necessary, the flask was gently rocked back and forth while inverted to drain any remaining liquid. The SRM-containing conditioned culture medium was filtered and subsequently stored in sterile polycarbonate bottles at −30° C.

Passage Cells from HYPERFlask™ Vessel

After cell cultured medium was removed, 100 mL of rinsing solution (DPBS, Dulbecco's Phosphate Buffered Saline; Invitrogen Cat. No. 14190) was added to the HYPERFlask™ vessel. The flask was recapped and lay on its side to allow the rinsing solution to distribute evenly between layers. The flask was then rotated back and forth 180° along its long axis several times (at least 4 times) so that the entire cell sheet in each layer is thoroughly rinsed. The flask was turned over and the rotation was repeated. The rinsing solution was discarded, and replaced by 50 mL of dissociation solution (TRYPLE Expression, Invitrogen). The flask was recapped and lay on its side to allow the rinsing solution to distribute evenly between layers. The flask was then rotated back and forth 180° along its long axis several times (at least 4 times) so that the entire cell sheet in each layer is thoroughly coated. The flask was turned over and the rotation was repeated to facilitate cell detachment. Microscopy was used to visually monitor cell detachment, which typically took less than 5 minutes. Once most cells were rounded and dislodged, the flask was shaken sharply and repeatedly to dislodge remaining cells.

Two 25-mL aliquots of 25 mL dislodged cells from each HYPERFlask™ vessel were transferred into two 50 mL conical centrifuge tubes each containing 20 mL of Complete MesenPRO RS™ medium pre-warmed at 37° C. The tubes were centrifuged at 200-210×g for 5 minutes at room temperature. After supernatant was discarded, the cell pellets was gently resuspended in 10-12 mL of Complete MesenPRO RS™ medium pre-warmed at 37° C., and were pooled into a single tube. 75 µL of the pooled cell suspension was mixed with 75 µL of 0.4% Trypan Blue solution, and a cell count was determined by using a hemacytometer before the cell suspension was used to seed additional HYPERFlask™ vessels.

The seeding densities were as follows.
a. Passage 4-5: $4.0-4.1 \times 10^6$ cells per flask.
b. Passage 6-7: $4.2-4.3 \times 10^6$ cells per flask.
c. Passage 8-10: $4.4-4.5 \times 10^6$ cells per flask.

For each of the flasks, a container was prepared with an appropriate volume of cell suspension combined with 500 mL of pre-warmed Complete MesenPRO RS™ media (37° C.), followed by the addition an appropriate volume of the growth medium to bring the total volume to 550 mL. The seeded growth medium was gently mixed by swirling to avoid generating foam, and transferred into a HYPERFlask™ vessel. If occurred, excessive bubbles were removed either by using a sterile transfer pipet or a serological pipet, or by tilting the flask from side to side firmly to dislodge bubbles trapped in the flask. If needed, additional growth medium was added to bring the fluid level in the flask equal to the second thread on the neck. The flasks were then recapped and incubated in a humidified growth chamber, at 37° C. and in the presence of 5% CO2.

General Protocol for Preparing Frozen Stocks of hADSC Cells

Partial or entire contents of HYPERFlask™ vessels are used for the preparation of frozen cell stocks by using a procedure similar to the passage protocol described above, through the centrifugation step. After centrifugation, the cell pellets were suspended in an appropriate volume of freshly prepared freezing medium [70% Complete MesenPro RS™ Medium; 20% fetal bovine serum (FBS; ScienCell Res. Lab., Cat. No. 0500); and 10% dimethyl sulfoxide (DMSO, Sigma Aldrich, Cat. No. D-2650)]. Cell suspension was aliquoted in 1 mL cryovials. The number of ADSC cells per vial was preferably ranging from 4-8×106 cells. The cryovials were placed in freezing cans containing isopropanol (Thermo Scientific, Cat. No. 5100-0001). The freezing cans were placed in −85° C. overnight before being transferred to a vapor phase of a self-filling liquid nitrogen freezer.

Cultivation of Human Dermal Fibroblasts (HDF)

Preparation of Fibroblast Medium

Fibroblast medium (ScienCell Research Laboratories, Carlsbad, CA, Cat. No. 2301) was prepared according to the manufacturer instructions, with some modifications. 10 mL of frozen fetal bovine serum (Cat. No. 0010) and 5 mL of frozen of fibroblast growth factor (Cat. No. 2352) were thoroughly thawed and mixed at 37° C. before they were added to each 500 mL of fibroblast medium (Cat. No. 2301).

Once prepared, the complete fibroblast medium was subsequently stored in the dark at 4° C. and used within 15 days.

Establishment of HDF Cultures

Cells of Human Dermal Fibroblasts in a commercial frozen vial were thawed quickly by swirling the vial in a 37° C. water bath (1-2 minutes). Once thawed, HDFs were immediately transferred into a 50-mL sterile conical tube containing 10-mL of pre-warmed fibroblast medium at 37° C. with gentle mixing. Cell suspension was centrifuged for 200×g at room temperature. The supernatant was discarded and the conical tube was drained briefly over sterile gauze. The supernatant was discarded and the conical tube was drained briefly over sterile gauze. Cell pellet was loosen by lightly tapping the tube on a hard surface, and gently resuspended in 10 mL of pre-warmed fibroblast medium (37° C.). 75 µL of the HDF cell suspension was mixed with 75 µL of 0.4% Trypan Blue solution, and a cell count was determined by using a hemacytometer.

Seeding

The fibroblast cell culture established as described above was used to aseptically seed T75 flasks or HYPERFlask® Cell Culture Vessels. For T75 flasks, 25-26 mL fibroblast media was pre-warmed to 37° C. prior to being seeded with approximately 5×103 cells per cm2, i.e. 3.75×105 cells per flask. For Corning HYPERFlask® vessels, fibroblast media was pre-warmed to 37° C. prior to being seeded with approximately 2-2.2×106 cells per flask. This seeding density typically supports the cell culture in the HYPERFlask™ vessel reaching a cell density of 90-95% within 7-8 days. For this purpose, an appropriate volume of cell suspension was added to 500 mL of pre-warmed fibroblast media (37° C.), followed by the addition an appropriate volume of the growth medium to bring the total volume to 550 mL. The seeded growth medium was gently mixed by swirling, and transferred into a HYPERFlask™ vessel. If occurred, excessive bubbles were removed and, if needed, additional growth medium was added to bring the fluid level in the flask equal to the second thread on the neck. After seeding, T75 flasks were placed on stainless steel tray in a humidified growth chamber, and incubated at 37° C. and in the presence of 5% CO2. Whenever available, a tri-gas incubator with hypoxic conditions (5% O2) was used. HYPERFlask™ vessels are incubated directly on the incubator shelf Harvest SRM, Passage and Freeze Cellsfrom HYPERFlask™ Vessels Harvest SRM-Containing Conditioned Media Upon reaching about 90-98% confluence, the cell cultured medium was aseptically transferred to a filter unit equipped with a 0.2 µM PES (polyethlysulfone) sterile filtration device. For this purpose, the HYPERFlask™ vessel was slowly tilted to pour the conditioned culture medium, which was determined to contain SRMs, into the filter unit. While pouring, the flask was slowly rotated 180° until the cell cultured medium was flowing down the angle neck (air dam) of the flask. When necessary, the flask was gently rocked back and forth while inverted to drain any remaining liquid. The SRM-containing cultured medium was filtered and subsequently stored in sterile polycarbonate bottles at −30° C.

Passage Cells from HYPERFlask™ Vessel

After cell cultured medium was removed, 100 mL of rinsing solution (DPBS, Dulbecco's Phosphate Buffered Saline; Invitrogen Cat. No. 14190) was added to the HYPERFlask™ vessel. The flask was recapped and lay on its side to allow the rinsing solution to distribute evenly between layers. The flask was then rotated back and forth 180° along its long axis several times (at least 4 times) so that the entire cell sheet in each layer is thoroughly rinsed. The flask was turned over and the rotation was repeated. The rinsing solution was discarded, and replaced by 50 mL of dissociation solution, which contained 10 mL Trypsin-EDTA (ScienCell, Cat. No. 0103) and 40 mL DPBS. The flask was recapped and lay on its side to allow the rinsing solution to distribute evenly between layers. The flask was then rotated back and forth 180° along its long axis several times (at least 4 times) so that the entire cell sheet in each layer is thoroughly coated. The flask was turned over and the rotation was repeated to facilitate cell detachment. Microscopy was used to visually monitor cell detachment, which typically took less than 5 minutes. Once most cells were rounded and dislodged, the flask was shaken sharply and repeatedly to dislodge remaining cells.

Two 25-mL aliquots of 25 mL dislodged cells from each HYPERFlask™ vessel were transferred into two 50 mL conical centrifuge tubes each containing 10 mL of fetal bovine serum (FBS, ScienCell, Cat. No. 0500).

The tubes were centrifuged at 200-210×g for 5 minutes at room temperature. After supernatant was discarded, the cell pellets were gently resuspended in 10-12 mL of complete firboblast medium pre-warmed at 37° C., and were pooled into a single tube. 75 µL of the pooled cell suspension was mixed with 75 µL of 0.4% Trypan Blue solution, and a cell count was determined by using a hemacytometer before the cell suspension was used to seed additional HYPERFlask™ vessels.

The seeding densities were as follows.

Passage 4-5: 2.0-2.1×106 cells per flask.
Passage 6-7: 2.2-2.3×106 cells per flask.
Passage 8-10: 2.4-2.5×106 cells per flask.

For each of the flasks, a container was prepared with an appropriate volume of cell suspension combined with 500 mL of pre-warmed fibroblast media (37° C.), followed by the addition an appropriate volume of the growth medium to bring the total volume to 550 mL. The seeded fibroblast medium was gently mixed by swirling to avoid generating foam, and transferred into a HYPERFlask™ vessel. If occurred, excessive bubbles were removed either by using a sterile transfer pipet or a serological pipet, or by tilting the flask from side to side firmly to dislodge bubbles trapped in the flask. If needed, additional growth medium was added to bring the fluid level in the flask equal to the second thread on the neck. The T75 flasks were then recapped and incubated in a humidified growth chamber, at 37° C. and in the presence of 5% CO2. Whenever available, a tri-gas incubator with hypoxic conditions (5% O2) was used. The HYPERFlask™ vessels were incubated directly on the incubator.

General Protocol for Preparing Frozen Stocks of HDF Cells

Partial or entire contents of HYPERFlask™ vessels are used for the preparation of frozen cell stocks by using a procedure similar to the passage protocol described above, through the centrifugation step. After centrifugation, the cell pellets were suspended in an appropriate volume of freshly prepared HDF freezing medium [80% complete fibroblast medium; 10% fetal bovine serum (FBS; ScienCell Res. Lab., Cat. No. 0500); and 10% dimethyl sulfoxide (DMSO, Sigma Aldrich, Cat. No. D-2650)]. Cell suspension was aliquoted in 1 mL cryovials. The number of HDF cells per vial preferably ranged from 4-6×106 cells. The cryovials were placed in freezing cans containing isopropanol (Thermo Scientific, Cat. No. 5100-0001). The freezing cans were placed in −85° C. overnight before being transferred to a vapor phase of a self-filling liquid nitrogen freezer.

In accordance with some alternatives of the invention, an amount of ADSC and an amount of HDF-f cell lines were individually provided in nutrient media and thawed in a water bath prior to sub culturing (passaging) in flasks. Upon reaching about 90% confluence, the respective conditioned media containing SRM's were harvested. Here, a sterile pipette was used to remove medium containing the ADSC and SRM-containing conditioned media from flasks and transferred to a 500 mL filter unit having a 0.33 μM pore size. Upon transfer of the medium, vacuum was applied and the SRM's were filtered into a receptacle. The SRM-containing conditioned media were then aliquoted and stored in sterile containers for subsequent use.

Subsequent to removing SRM-containing conditioned media, the cells were passaged and frozen. Dulbecco's phosphate buffered saline (DPBS) was used to lift cells from the surface of flasks and MesenPro RS medium was used for culture.

The HDF-f cells were similarly processed to extract SRM-containing conditioned media, passage cells, and freeze. HDF-f cells were cultured in fibroblast medium.

The SRM-containing conditioned media derived from ADSC cultures and HDF-f cultures were each thawed in a water bath at 37° C. and combined in a 50/50 ratio by volume.

The conditioned media were then filtered by vacuum into an all-in-one receptacle and stored in a sterile container at 4° C.

Example 2

Preparation of S2RM (50% ADSC Conditioned Medium and 50% HDF-f Conditioned Medium)

Desired volumes of the conditioned culture medium derived from each of the cultured cell lines were thawed in 37° C. water bath. Equivalent volume of conditioned culture medium derived from each of the cultured cell lines was measured and deposited into the top compartment of an all-in-one filter unit that was equipped with polyethylsulfone membrane having 0.22 μM pore size. Vacuum was applied and the filtered conditioned culture medium was collected in the all-in-one receptacle. The top compartment of the all-in-one receptacle was removed and replaced with a sterile cap. The receptacle was then sealed with parafilm and stored at 4° C.

In another iteration of this method and composition, the uses on Serum Free media can be used. Serum Free media permits the same growth, passaging and collection of SRM but without the addition of the proteins associated with Serum containing media. The significance of this variation has not been determined but is believed to be relevant regarding regulatory approval of said compositions. Commercially available, Serum Free media are available from ThermoFisher Scientific, StemGro which has been successful growing the ADSC cell line. Another Serum Free media, known in the art as Essential 8 (E8) is also commercially available and can also be formulated in the lab for reducing the overall cost of goods for the final SRM product. The serum freed media, E8 is compatible with the fibroblast cell line for growth, passage and harvesting of the SRM.

In yet another iteration of this method and composition, a more reductionist approach may be taken by using the "known" human derived antimicrobials either individually or as a composition of multiple molecules which will comprise the Minimal Molecular Set or MMS, necessary and sufficient to mediate or eliminate HLB in citrus trees. The MMS may include: peptide LL-37, lipocalin 2, keratinocyte growth factor, and Defensens applied either independently or in combination with another or all of these mediators of antimicrobial activity.

In accordance with the above alternative, mesenchymal stem cells have been shown to release molecules that include: HLA-A, -B, and -C, exosomes, MSC IL-6, M-CSF, PGE2, IDO, TGF-, HLA-G, and PGE2, IL-I, IL-6, GDNF, BDNF, IGF-I, VEGF, GDNF, NGF, bFGF, BMP-4, bFGF, VEGF, PDGF, IL-I p, IL-I 0, stem cell-derived factor-(SDF-) I, HGF, IGF-I, thymosin-P4, and Wnt5a, IL-I P and TNF-a, bFGF, HGF, angiopoietin-I and -2 (Ang-I and -2), cysteine-rich protein 6 I ,antioxidants, proteasomes, peptide LL-37, lipocalin 2, keratinocyte growth factor. Fibroblasts have been shown to release the antimicrobial molecules characterized as Defensins.

It should be borne in mind that all patents, patent applications, patent publications, technical publications, scientific publications, and other references referenced herein are hereby incorporated by reference in this application in order to more fully describe the state of the art to which the present invention pertains.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the preceding definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, any means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

The invention claimed is:

1. A method of reducing, mitigating or eliminating the incidence of one or more insect-vectored bacterial infections that result in Citrus Greening, comprising administering an SRM bioactive composition to at least one infected citrus tree comprising of the composition of conditioned culture media from two or more cell types
wherein the SRM composition is prepared by culturing cells of a first cell line and a second cell line in a first and a second culture medium, respectively, wherein said cells secrete extracellular products into the respective culture medium so that a first conditioned culture medium and a second conditioned culture medium are respectively formed; and combining said first and said second conditioned culture medium to form the SRM bioactive composition, wherein said first and second cell lines are different from one another and are each selected from the group consisting of an adipose-derived stem cell (ADSC) line, a non-adipose mesenchymal stem cell line, and a fibroblast cell line.

2. The method of claim 1, wherein said first cell line is an ADSC line.

3. The method of claim 1, wherein said second cell line is a fibroblast cell line.

4. The method of claim 1, wherein said SRM bioactive composition includes a third conditioned culture medium conditioned by cells of a third cell line.

5. The method of claim 1, wherein at least one of said first or second cell lines is a human cell line.

6. The method of claim 1, wherein each of said culturing steps is performed for at least 2 days, at least 5 days, at least 7 days, at least 8 days, or at least 10 days.

7. The method of claim 1, wherein each of said culturing steps is carried out until said culture reaches at least 85%, at least 90%, at least 95%, or at least 98% cell confluence.

8. The method of claim 1, wherein cells of at least one of said cell lines have been passaged multiple times to produce said conditioned culture media.

9. The method of claim 1, wherein said cells have been passaged at least 2, 3, 4, 5, 6, 7, 8, 9, or 10 times to produce said conditioned culture media.

10. The method of claim 1, wherein cells of at least one of said cell lines are passaged after reaching at least 85%, at least 90%, at least 95%, or at least 98% cell confluence.

11. The method of claim 1, wherein said SRM bioactive composition comprises a ratio of said first conditioned culture medium to said second conditioned culture medium of between about 1:10 to about 10:1.

12. The method of claim 1, wherein said ratio is about 1:1.

13. A method for treating a bacterial infection including Citrus Greening, Canker or Post Blossom Fruit Drop in a subject tree or plant in need thereof comprising administering to said subject a therapeutically effective amount of the SRM bioactive composition prepared by culturing cells of a first cell line and a second cell line in a first and a second culture medium, respectively, wherein said cells secrete extracellular products into the respective culture medium so that a first conditioned culture medium and a second conditioned culture medium are respectively formed; and
combining said first and said second conditioned culture medium to form the SRM bioactive composition, wherein said first and second cell lines are different from one another and are each selected from the group consisting of an adipose-derived stem cell (ADSC) line, a non-adipose mesenchymal stem cell line, and a fibroblast cell line.

14. The method of claim 13 for treating a bacterial infection in subject trees and plants, wherein said administering comprises topical administration of said SRM bioactive composition to the leaves, bark or roots of said subject via a carrier vehicle selected from the group consisting of a liquid drop, a liquid wash, an ointment, a cream, a gel, a powder, a salve, a lotion, a foam, a spray, and a liposome.

* * * * *